Patented Jan. 1, 1935

1,986,543

UNITED STATES PATENT OFFICE 1,986,543

METHOD OF CANNING SWEET POTATOES

John H. Stansbury, Fruitland, Md., assignor of one-half to Ralph O. Dulany, Fruitland, Md.

No Drawing. Application January 24, 1931, Serial No. 511,110

2 Claims. (Cl. 99—8)

This invention relates to preserving vegetables for use as food, and more particularly to an improved method of canning sweet potatoes, and to the product resulting from such method.

Many attempts have heretofore been made to devise a practical, desirable and effective method of canning sweet potatoes, but such attempts have so far been only moderately successful.

The canning of sweet potatoes presents very special problems, because of the peculiar nature and properties of the material. In the first place, sweet potatoes are especially subject to fermentation, and it is difficult to sterilize them, the experience of most packers being that notwithstanding careful processing, a certain percentage of bad cans or "swells" cannot be avoided. And in the second place, sweet potatoes, originally golden in color, show a marked tendency to darken or blacken in the cans, this discoloration being apparently due to the presence of small quantities of air.

In order to effectively sterilize the potatoes and prevent the inclusion of air in the can, one of the well known commercial methods of canning has been to first thoroughly cook the potatoes, then mash them into a soft pulp, and pack the cans completely full of a solid mass of this pulp. In this way, all of the air in the can was displaced, and a product obtained which held its color fairly well, but the pulped mass, when taken from the can, was rather unattractive in appearance, and its physical condition rendered it unsuitable for many uses and for many styles of serving to which sweet potatoes are normally adapted.

Recognizing the great desirability of preserving sweet potatoes in their natural whole or lump condition, other packers have employed what is known as the "vacuum" method of canning. In this method, the potatoes, having previously been peeled, are placed in a can whole, or in relatively large pieces, as distinguished from being mashed or pulped, and then the major portion of the air is exhausted from the can before sealing. This gives a product which has many advantages over the pulped potatoes, but it is more expensive, and requires a special can capable of withstanding the pressure.

The object of the present invention is to provide a cheap and satisfactory method by which sweet potatoes may be canned whole or in large pieces and will be entirely protected from contact with air, whereby they will retain their color and attractive appearance, and in which ordinary commercial cans may be employed.

To this end, I proceed as follows. I take sweet potatoes, preferably in the raw state, and first peel them or remove the skins by subjecting them to the action of a solution of caustic soda. This may be of a strength of from 10% to 20%, and a treatment of from three to seven minutes usually suffices to remove the skins. After washing, the potatoes are packed in the cans either in the natural whole state, or cut into relatively large pieces. Preferably the smaller sized potatoes are used, as these not only facilitate packing, but are more tender and free from coarse fibre. In packing, the object is to get the maximum quantity of material into the cans, so that the empty spaces or voids will be as small as possible.

I prepare a syrup preferably made by dissolving ordinary cane or beet sugar in water, a mixture of one pound of sugar to a gallon of water having been found satisfactory. Different proportions of sugar and water may, of course, be used, if desired, and a suitable spice or flavoring is preferably added.

The cans having been packed with potatoes, as above described, are then filled level full of this syrup, which has preferably been heated to a high temperature and is boiling hot. The syrup fills the voids between the potatoes, and completely displaces the air.

As soon as the cans have been filled with syrup, they are sealed, and then subject to a prolonged cooking or processing, under pressure, in closed retorts. The time and temperature required varies with the size of the can, but in practice I have obtained excellent results by processing a #2½ can, for example, for 50 minutes at a temperature of about 240° F., while larger cans are cooked for a longer period.

After cooking or processing, as described, the cans are removed from the retort and cooled, as by means of water, and are then ready for labeling and shipment or storage.

When the cans are opened, the potatoes are found to be firm, of good color, and apparently coated with a kind of glaze, which adds to their attractive appearance. They lend themselves readily to any style of further cooking and serving to which the fresh vegetable is adapted, as, for instance, the making of so-called "candied" sweet potatoes.

The distinguishing characteristic of my improved process and product, is the fact that the potatoes are packed in the can raw, and when taken out are either whole or in large, firm pieces, instead of being in a mashed or pulped mass, as in the usual prior methods.

What I claim is:—

1. The method of canning sweet potatoes which comprises peeling the potatoes, packing them in whole or lump condition in a can, filling the can with hot boiling syrup, so that the syrup occupies all of the voids between the pieces of potato, and then sealing the can and processing the same.

2. The method of canning sweet potatoes which comprises peeling the potatoes, packing them in whole or lump condition in a can, filling the can with boiling hot syrup so that the syrup occupies all of the voids between the pieces of potato and then sealing the can and processing the same at a temperature of substantially 240° F. for a period of at least fifty minutes.

JOHN H. STANSBURY.